United States Patent
Hornemann et al.

(10) Patent No.: US 6,254,150 B1
(45) Date of Patent: *Jul. 3, 2001

(54) LOCKING ARRANGEMENT FOR A MOVABLE VEHICLE BODY PART

(75) Inventors: Evelin Hornemann, Gechingen; Martin Ebner, Grafenau; Peter Kolb, Bad Liebenzell, all of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,806

(22) Filed: Jun. 25, 1996

(30) Foreign Application Priority Data

Aug. 4, 1995 (DE) .............................. 195 28 789

(51) Int. Cl.$^7$ .............................. E05C 3/32; B62D 25/12
(52) U.S. Cl. .................... 292/341.18; 292/DIG. 14; 292/DIG. 60; 411/107; 411/418
(58) Field of Search ............... 292/341.18, 341.19, 292/DIG. 60, DIG. 14, 340; 411/106, 107, 183, 195, 196, 184, 172, 173, 174, 417, 418

(56) References Cited

U.S. PATENT DOCUMENTS

| | | | |
|---|---|---|---|
| 768,954 | * | 8/1904 | Romberger .................. 411/196 X |
| 1,119,321 | * | 12/1914 | Schmidgall .................. 292/341.18 |
| 1,571,965 | * | 2/1926 | Polson .................. 292/DIG. 14 X |
| 2,172,169 | * | 9/1939 | Claud-Mantle .................. 292/DIG. 14 |
| 2,265,691 | * | 12/1941 | Hogg .................. 292/341.18 |
| 2,286,739 | * | 6/1942 | Krause .................. 292/341.19 |
| 2,333,466 | * | 11/1943 | Claud-Mantle .................. 292/341.19 X |
| 2,486,003 | * | 10/1949 | Christensen .................. 292/DIG. 14 X |
| 2,865,668 | * | 12/1958 | Krause .................. 292/216 |
| 4,320,912 | * | 3/1982 | Grace et al. .................. 292/341.18 |
| 4,530,529 | * | 7/1985 | Poe et al. .................. 292/341.18 X |
| 4,852,923 | * | 8/1989 | Harmon et al. .................. 292/341.18 |

FOREIGN PATENT DOCUMENTS

| 43965 | * | 8/1908 | (CH) .................. 411/195 |
|---|---|---|---|
| 159778 | * | 3/1921 | (GB) .................. 411/195 |

* cited by examiner

Primary Examiner—Darnell Jayne
(74) Attorney, Agent, or Firm—Evenson, McKeown, Edwards & Lenahan, P.L.L.C.

(57) ABSTRACT

Locking arrangement for a movable vehicle body part. For adjusting an engine hood relative to the stationary vehicle body parts, it is known from prior art to fasten a lock top part by means of washers to the engine hood in such a manner that, when the engine hood is closed and therefore in the case of a connection of the lock top part with the lock bottom part, a precise fit of the engine hood is achieved. According to the invention, the catch bow is held on the assigned vehicle body part by means of a continuous linear adjusting device.

8 Claims, 1 Drawing Sheet

LOCKING ARRANGEMENT FOR A MOVABLE VEHICLE BODY PART

BACKGROUND AND SUMMARY OF THE INVENTION

This invention relates to a locking arrangement for a movable vehicle body part, particularly an engine hood, of a motor vehicle having two lock parts, of which one is assigned to the movable vehicle body part and the other is assigned to a stationary vehicle body part of the motor vehicle, one lock part having a catch bow to which adjusting devices are assigned for adjusting the height of the catch bow relative to the assigned vehicle body part.

Engine hood locking systems are known from Mercedes-Benz passenger cars in the case of which the adjustment of the height of a locking top part relative to the engine hood is implemented by the underlaying of adjusting plates on the screw-on surface of the lock top part. The precise is adjustment of the height of the lock top part relative to the engine hood determines the fit and the accuracy of the fit of the engine hood, relative to the vehicle body parts defining the engine space of the passenger car. Only if the height of the engine hood is adjusted precisely relative to the body, will there be a uniform overall appearance of the vehicle body. However, in order to precisely adjust the lock top part on the engine hood, several operations are required in order to be able to precisely position several adjusting plates. In addition, the thickness of the adjusting plates defines the progressive ratio of the adjusting operation. For underlaying the adjusting plates, the lock top part must be unscrewed. According to the requirements, the number of the adjusting plates to be underlaid must be increased or decreased. This requires in each case a repetition of the different adjusting operations. In addition, all adjusting operations can be carried out only when the engine hood is open.

It is an object of the invention to provide a locking arrangement of the type generally described above by means of which the movable vehicle body part can be adjusted in a simple manner and at low time expenditures with respect to the stationary vehicle part.

This and other objects have been achieved according to the present invention by providing a locking arrangement in which the catch bow is held by means of a continuous linear adjusting device on the assigned vehicle body part. As a result, the catch bow can be continuously adjusted in its height on the assigned vehicle body part without the requirement that the catch bow has to be detached from the vehicle body part for the adjustment. Such an adjustment is also possible when the body part is already closed so that a precise adjustment can be achieved in just one operation. As a result of the solution according to the invention, the mounting time can be considerably reduced.

In an embodiment of the invention, the catch bow is rigidly fastened on a threaded spindle which is held in an adjusting nut rotatably disposed in the assigned vehicle body part. This is a particularly simple mechanical construction which has a high operating reliability.

In a further embodiment of the invention, the adjusting nut is constructed as a stop nut. As a result, the threaded spindle and therefore the catch bow are prevented from rotating out of the adjusting nut and thus detaching from the vehicle body part during the operation of the passenger car, due to jolts or vibrations.

In a further embodiment of the invention, a protection device against torsion for the catch bow is arranged on the vehicle body part. As a result, it is ensured that the catch bow always has the same angular position and can therefore lock in the other lock part in a simple manner independently of its height adjustment.

These and other objects, features and advantages of the present invention will become more readily apparent from the following detailed description when taken in conjunction with the accompanying drawings.

DETAILED DESCRIPTION OF THE DRAWINGS

Figure 1:
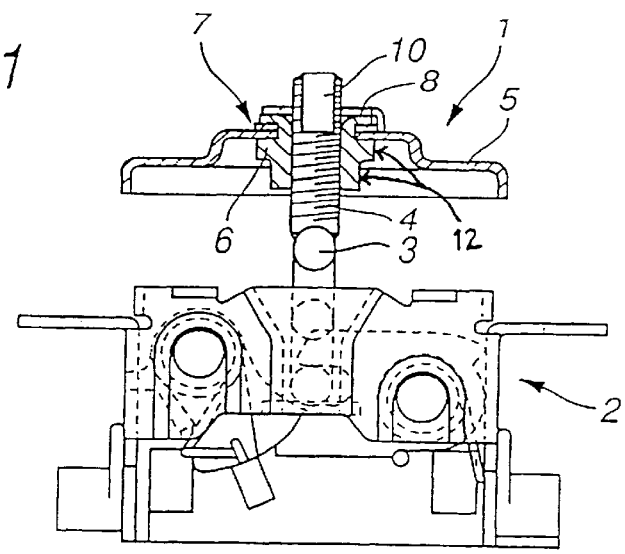
FIG. 1 is a partially sectional view of a locking arrangement according to the a preferred embodiment of invention in which a lock top part is secured in a stationary lock bottom part.
Figure 2:
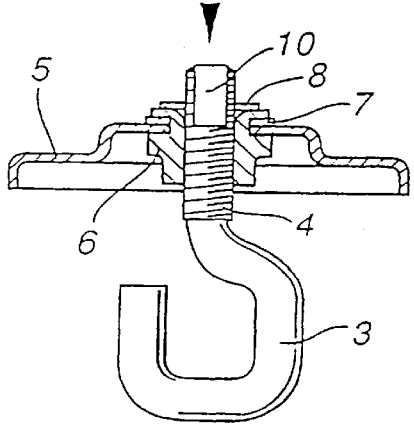
FIG. 2 is a partially sectional view of the lock top part according to FIG. 1.

A locking arrangement according to FIG. 1 has a lock top part 1 which is fastened to the bottom side of an engine hood of a passenger car. A lock bottom part 2 is fastened to a stationary vehicle body part which bounds an engine space of the passenger car. The lock bottom part 2 has the actual engine hood lock with the different lock elements which are known per se. The lock top part 1 has a catch bow 3 which, when the engine hood is closed, is locked in the lock bottom part 2. A linear adjusting device 4, 6 as described below, is assigned to the lock bow 3, for the adjustment of the height of the catch bow 3 relative to the engine hood and is also part of the lock top part 1.

Figure 3:
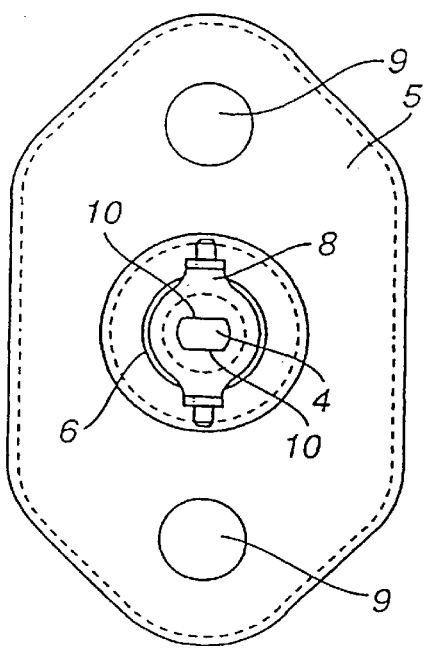
FIG. 3 is a top view of the lock top part in the direction of the arrow III in FIG. 2.

The catch bow 3 is connected in one piece with a threaded spindle 4 which projects toward the engine hood which is not shown. The threaded spindle 4 is held in an adjusting bush 6 which has an internal thread adapted to the external thread of the threaded spindle 4. The adjusting bush 6 is rotatably riveted into a base plate 5. A washer 7 consisting of plastic between the adjusting bush 6 and the base plate 5 increases the friction during rotation of the adjusting bush 6 relative to the base plate 5, whereby the function of the adjusting bush 6 as a stop nut is achieved. The base plate 5 is fastened to the bottom side of the engine hood, for the purpose of which fastening bores 9 are provided, as shown in FIG. 3. The outer contour of the adjusting bush 6 is provided with tool engagement surfaces 12 for mating engagement with an adjustment tool, in the case of the illustrated embodiment, in the form of a hexagonal contour.

A free end of the threaded spindle 4 projects through the adjusting bush 6 and through the base plate 5 toward the inside of the engine hood. This end of the threaded spindle 4 is provided with two flattened areas 10 on opposite sides of the threaded spindle 4 which are entered into the threaded spindle 4 in the form of notched bar impacts. The length of these flattened areas 10 relative to the threaded spindle 4 is adapted to the maximal height adjustability of the catch bow 3. The free end of the threaded spindle 4 is enclosed by a locking plate 8 which extends over the top side of the adjusting bush 6 and encloses the threaded spindle 4 by means of an opening adapted to the flattened outer contour of the threaded spindle 4. The locking plate 8 is fixed to the base plate 5. As a result, the threaded spindle 4 and therefore also the catch bow 3 are secured with respect to torsion. A rotation of the catch bow 3 and thus also of the threaded spindle 4 out of the adjusting bush 6 during the driving operation of the passenger car due to vibrations or jolts is avoided.

FIG. 1 illustrates the closed position of the engine hood in which the catch bow 3 is caught in the lock bottom part 2. In order to now be able to adjust the precise fit of the engine hood relative to the stationary vehicle body parts, in a simple manner, the height of the catch bow 3 is adjusted relative to the base plate 5 and thus also relative to the engine hood, whereby the engine hood is either pulled closer to the stationary vehicle body part or is pressed farther away from it. An adjustment of the height takes place by rotating the adjusting bush 6, for which, in a simple manner, while the engine hood is closed, a fork wrench can be guided from the outside to the corresponding tool engagement surfaces 12 of the adjusting bush 6. As illustrated in FIG. 1, the base plate 5 is constructed in a plate or shell shape in such a manner that the application of a fork wrench to the adjusting bush 6 is easily possible.

By rotating the adjusting bush 6, the catch bow 3 is moved upward or downward, in which case, because of the securing against torsion by means of the locking plate 8, the catch bow 3 does not rotate. By rotating the adjusting bush 6, only a linear axial adjustment is achieved of the catch bow 3 relative to the base plate 5 and thus relative to the engine hood. Therefore, in a single operation, a precise adjustment of the engine hood can be achieved relative to the stationary vehicle body parts, and consequently the mounting time for the adjustment of the engine hood is considerably reduced. Furthermore, by adjusting the engine hood relative to the stationary vehicle body parts according to the invention, the precise fit of the sealing arrangement situated between the engine space body parts and the engine hood is also defined so that a secure sealing-off of the engine space by the engine hood is achieved without any excessive pressure which could damage the sealing arrangement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking arrangement for a hood of a motor vehicle comprising:
    a first lock part for connection to the hood; and
    a second lock part for connection to a stationary vehicle body part of the motor vehicle;
    wherein said first lock part comprises a catch bow, a spindle having an external thread rigidly fixed to said catch bow, an adjusting bush having an internal thread, and means for attachment to one of the hood and the stationary vehicle body part,
    said adjusting bush being rotatably connected about an axis of rotation to said means for attachment and being fixed along said axis, said external thread of said spindle being engaged with said internal thread of said adjusting bush such that rotation of said adjusting bush moves said spindle along said axis,
    wherein said means for attachment comprises a base plate for being fixed to said one of the hood and the stationary vehicle body part, and
    wherein said adjusting bush comprises a first flange located on one side of the base plate, a second flange located on the other side of the base plate, and a connecting portion connecting said first and second flanges and extending through a hole defined in said base plate.

2. A locking arrangement according to claim 1, wherein in an assembled position when said first lock part connected to the hood, said axis extends essentially perpendicular to an exterior surface of the hood.

3. A locking arrangement for a hood of a motor vehicle comprising:
    a hood;
    a first lock part which is connected to the hood;
    a stationary vehicle body part proximate said hood; and
    a second lock part which is connected to the stationary vehicle body part;
    wherein said first lock part comprises a catch bow, a spindle having an external thread rigidly fixed to said catch bow, an adjusting bush having an internal thread, and a base plate fixed to one of the hood and the stationary vehicle body part,
    said adjusting bush being rotatable connected about an axis of rotation to said base plate and being fixed along said axis, said axis extending essentially perpendicular to an exterior surface of said hood, said external thread of said spindle being engaged with said internal thread of said adjusting bush such that rotation of said adjusting bush moves said spindle along said axis, and
    wherein said adjusting bush comprises a first flange located on one side of the base plate, a second flange located on the other side of the base plate, and a connecting portion connecting said first and second flanges and extending through a hole defined in said base plate.

4. A locking arrangement according to claim 3, wherein said first flange, said second flange, and said connecting portion are a single integral component.

5. A locking arrangement according to claim 1, wherein the adjusting bush is constructed as a stop nut.

6. A locking arrangement according to claim 1, wherein a locking device is arranged to engage said spindle to prevent rotation of the catch bow.

7. A locking arrangement according to claim 6, wherein said spindle is configured with at least one flattened area at an end, said locking device being constructed as a plate having an opening which corresponds to and engages with said flattened area of the spindle in order to prevent rotation of the catch bow.

8. A locking arrangement for a hood of a motor vehicle comprising:
    a first lock part for connection to one of a vehicle hood and a stationary vehicle body part of the motor vehicle; and
    a second lock part for connection to the other of the vehicle hood and the stationary vehicle body part of the motor vehicle;
    wherein said first lock part comprises a catch bow, a spindle having an external thread rigidly fixed to said catch bow, an adjusting bush having an internal thread, and means for attachment to one of the hood and the stationary vehicle body part,
    said adjusting bush being rotatably connected about an axis of rotation to said means for attachment and being fixed along said axis, said external thread of said spindle being engaged with said internal thread of said adjusting bush such that rotation of said adjusting bush moves said spindle along said axis,
    wherein said adjusting bush comprises a first flange located on one side of the base plate, a second flange located on the other side of the base plate, and a connecting portion connecting said first and second flanges and extending through a hole defined in said base plate.

* * * * *